United States Patent
Kwon et al.

(10) Patent No.: US 11,127,946 B2
(45) Date of Patent: Sep. 21, 2021

(54) NEGATIVE ELECTRODE FOR RECHARGEABLE BATTERY AND RECHARGEABLE BATTERY INCLUDING THE SAME

(71) Applicant: SAMSUNG SDI CO., LTD., Yongin-si (KR)

(72) Inventors: Hyejin Kwon, Yongin-si (KR); Bokhyun Ka, Yongin-si (KR); Kyeuyoon Sheem, Yongin-si (KR); Jinhyon Lee, Yongin-si (KR); Daeseop Lim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 156 days.

(21) Appl. No.: 16/463,935

(22) PCT Filed: Nov. 30, 2017

(86) PCT No.: PCT/KR2017/013908
§ 371 (c)(1),
(2) Date: May 24, 2019

(87) PCT Pub. No.: WO2018/101765
PCT Pub. Date: Jun. 7, 2018

(65) Prior Publication Data
US 2020/0388832 A1    Dec. 10, 2020

(30) Foreign Application Priority Data

Nov. 30, 2016  (KR) .................. 10-2016-0162081
Nov. 28, 2017  (KR) .................. 10-2017-0160980

(51) Int. Cl.
*H01M 4/36*    (2006.01)
*H01M 4/133*   (2010.01)
(Continued)

(52) U.S. Cl.
CPC ........... *H01M 4/366* (2013.01); *H01M 4/133* (2013.01); *H01M 4/386* (2013.01); *H01M 4/387* (2013.01);
(Continued)

(58) Field of Classification Search
CPC ............. H01M 4/366; H01M 4/133; H01M 2004/027; H01M 4/0404; H01M 4/583
See application file for complete search history.

(56) References Cited

U.S. PATENT DOCUMENTS

| 6,403,259 B1 | 6/2002 | Kitagawa et al. |
| 2004/0072076 A1 | 4/2004 | Matsubara et al. |

(Continued)

FOREIGN PATENT DOCUMENTS

| CN | 1227004 A | 8/1999 |
| CN | 101425579 A | 5/2009 |

(Continued)

OTHER PUBLICATIONS

International Search Report for PCT/KR2017/013908 filed on Nov. 30, 2017.

(Continued)

*Primary Examiner* — Bach T Dinh
(74) *Attorney, Agent, or Firm* — Lee IP Law, P.C.

(57) ABSTRACT

Disclosed are a negative electrode for a rechargeable battery and a rechargeable battery including the same. The negative electrode for a rechargeable battery according to an exemplary embodiment of the present invention includes a substrate and an active material layer including graphite formed on at least one surface of the substrate, wherein the active material layer includes an internal layer relatively adjacent to the substrate and a surface layer relatively away from the substrate and the internal layer and the surface layer have a degree of divergence (DD) defined by Equation 1 below, and the DD value of the surface layer is 6% to 50% of the DD value of the internal layer.

(Continued)

DD(Degree of Divergence)=$(I_a/I_{total}) \times 100$ [Equation 1]

(Ia is a sum value of peak intensities appearing at a non-planar angle when XRD is measured using a CuKα line, and Itotal is a sum value of peak intensities appearing at every angle when XRD is measured using the CuKα line).

6 Claims, 8 Drawing Sheets

(51) Int. Cl.
    *H01M 4/38*     (2006.01)
    *H01M 4/485*     (2010.01)
    *H01M 4/587*     (2010.01)
    *H01M 4/62*     (2006.01)
    *H01M 10/0525*     (2010.01)
    *H01M 4/02*     (2006.01)

(52) U.S. Cl.
    CPC ........... *H01M 4/485* (2013.01); *H01M 4/587* (2013.01); *H01M 4/62* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2009/0111031 | A1 | 4/2009 | Hirose et al. |
| 2012/0009475 | A1 | 1/2012 | Nakura |
| 2013/0140488 | A1 | 6/2013 | Sotowa et al. |
| 2013/0177792 | A1 | 7/2013 | Takahata et al. |
| 2013/0260217 | A1* | 10/2013 | Matsui ............... B60L 50/64 429/163 |
| 2014/0038055 | A1 | 2/2014 | Hozumi et al. |
| 2014/0141304 | A1 | 5/2014 | Takahata et al. |
| 2014/0170487 | A1 | 6/2014 | Takahata et al. |
| 2015/0030931 | A1* | 1/2015 | Takahata ............... H01M 4/587 429/231.8 |
| 2016/0093872 | A1 | 3/2016 | Wood et al. |
| 2018/0123120 | A1* | 5/2018 | Lee ............... H01M 4/485 |

FOREIGN PATENT DOCUMENTS

| | | |
|---|---|---|
| CN | 102362375 A | 2/2012 |
| CN | 103081191 A | 5/2013 |
| CN | 103119774 A | 5/2013 |
| CN | 103367709 A | 10/2013 |
| CN | 103579580 A | 2/2014 |
| CN | 103733390 A | 4/2014 |
| CN | 105210214 A | 12/2015 |
| JP | 2014-137879 A | 7/2014 |
| JP | 5929114 B2 | 6/2016 |
| KR | 10-2002-0019676 A | 3/2002 |
| KR | 10-0445438 B1 | 8/2004 |
| KR | 10-1517322 B1 | 4/2015 |
| WO | WO 2013/088540 A1 | 6/2013 |

OTHER PUBLICATIONS

Extended European Search Report dated Jun. 30, 2020.
Chinese Office action and Search Report dated Jul. 30, 2021.

* cited by examiner 82,84

NEGATIVE ELECTRODE FOR RECHARGEABLE BATTERY AND RECHARGEABLE BATTERY INCLUDING THE SAME

CROSS-REFERENCE TO THE RELATED APPLICATION

This is the U.S. national phase application based on PCT Application No. PCT/KR2017/013908, filed Nov. 30, 2017, which is based on Korean Patent Application No. 10-2016-0162081 filed on Nov. 30, 2016 and Korean Patent Application No. 10-2017-0160980 filed on Nov. 28, 2017, the entire contents of all of which are hereby incorporated by reference.

TECHNICAL FIELD

The present invention relates to a negative electrode, and more particularly, to a negative electrode for a rechargeable battery and a rechargeable battery including the same.

BACKGROUND ART

Recently, lithium rechargeable batteries which have come into prominence as power sources for portable compact electronic devices use an organic electrolyte, having a discharge voltage which is double or greater than that of existing batteries using an aqueous alkaline solution, resultantly exhibiting high energy density.

As positive electrode active materials for lithium rechargeable batteries, an oxide including lithium having a structure enabling intercalation of lithium ions such as $LiCoO_2$, $LiMn_2O_4$, $LiNi_{1-x}Co_xO_2$ (0<x<1), or the like, and a transition metal is commonly used.

As negative electrode active materials, various types of carbon-based materials including artificial graphite, natural graphite, and hard carbon enabling intercalation and deintercalation of lithium have been applied.

The negative electrode active material, which is in the form of paste including a solid including a graphite active material as a carbon-based material and a dispersion, is applied to a substrate to form an active material layer. Here, electrochemical characteristics of rechargeable batteries vary depending on density and an orientation form of the active material layer.

DISCLOSURE

Technical Problem

The present invention has been made in an effort to provide a negative electrode for a rechargeable battery and a manufacturing method thereof having advantages of enhancing electrochemical characteristics of a rechargeable battery.

Technical Solution

An exemplary embodiment of the present invention provides a negative electrode for a rechargeable battery including: a substrate; and an active material layer including a carbon-based negative electrode active material formed on at least one surface of the substrate, wherein the active material layer includes an internal layer relatively adjacent to the substrate and a surface layer relatively away from the substrate and the internal layer and the surface layer have a degree of divergence (DD) defined by Equation 1 below, and the DD value of the surface layer is 6% to 50% of the DD value of the internal layer.

$$DD(\text{Degree of Divergence}) = (I_a/I_{total}) \times 100 \qquad [\text{Equation 1}]$$

(in Equation 1, $I_a$ is a sum value of peak intensities appearing at a non-planar angle when XRD is measured using a CuKα line, and $I_{total}$ is a sum value of peak intensities appearing at every angle when XRD is measured using the CuKα line).

The active material layer may include artificial graphite or a mixture of artificial graphite and natural graphite.

The active material layer may further include at least one of Si-based, Sn-based, LiMOx (M=metal)-based negative electrode active materials.

The internal layer may be in contact with the substrate.

The DD value of the internal layer is 50 to 80 and the DD value of the surface layer is 4 to 26.

A thickness of the internal layer may be 30% or less of a thickness of the active material layer.

Another exemplary embodiment of the present invention provides the negative electrode described above, an electrolyte, and a positive electrode.

Advantageous Effects

As described above, the exemplary embodiments of the present invention may provide the negative electrode for a rechargeable battery and the manufacturing method thereof capable of enhancing electrochemical characteristics of the rechargeable battery.

MODE FOR INVENTION

Figure 1:
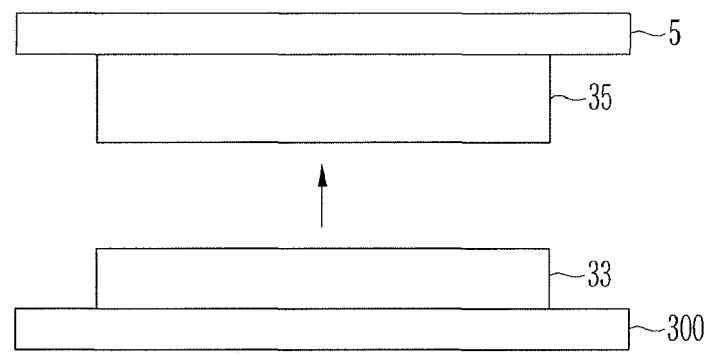
FIG. 1 is a view illustrating a process of separating an active material layer according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant description of the same components will be omitted.

Also, in this specification, it is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Also, the terms used in this specification are used to describe specific embodiments only, and it not intended to limit the present invention.

Also, as used herein, the singular forms "a", "an" and "the" are intended to include the plural forms as well, unless the context clearly indicates otherwise.

Also, in this specification, it should be appreciated that the terms "comprise(s)", "comprising", "include(s)", and "including", or "have(has)" when used in this specification and in the following claims are intended to specify the presence of stated features, integers, steps, acts, elements, components or combination thereof, but they do not preclude the presence or addition of one or more other features, integers, steps, acts, elements, components or combination thereof.

Also, in this specification, the term 'and/or' include a combination of a plurality of described items or any of a plurality of described items. Also, in this specification, 'A or B' may include 'A', 'B', or 'both A and B'.

A negative electrode for a lithium rechargeable battery according to an exemplary embodiment of the present invention includes a substrate and an active material layer formed on the substrate and including a carbon-based negative electrode active material. The active material layer is a negative electrode having a degree of divergence (DD) defined by Equation 1 below, as 19 or greater.

DD(Degree of Divergence)=$(I_a/I_{total})\times 100$   [Equation 1]

In Equation 1, $I_a$ is a sum value of peak intensities appearing at a non-planar angle when XRD is measured using a CuKα line, and $I_{total}$ is a sum value of peak intensities appearing at every angle when XRD is measured using the CuKα line.

Here, the non-planar angle refers to 2θ=42.4±0.2°, 43.4±0.2°, 44.6±0.2°, 77.5±0.2° when XRD is measured using the CuKα line. That is, the non-planar angle represents (100) plane, (101) (rhombohedral, R) plane, (101) (hexagonal, H) plane, and (110) plane.

Also, here, every angle refers to 2θ=26.5±0.2°, 42.4±0.2°, 43.4±0.2°, 44.6±0.2°, 54.7±0.2°, 77.5±0.2° when XRD is measured using the CuKα line. That is, every angle represents (002) plane, (100) plane, (101)R plane, (101)H plane, (004) plane, and (110) plane. Here, the peak intensity values may be integrated area values of peaks.

In an exemplary embodiment of the present invention, the XRD is measured using the CuKα line as a target line. In order to enhance peak intensity resolution, a monochromator device was removed and measurement was performed under the conditions of 2θ=10° to 80°, a scan speed (°/S) of 0.044 to 0.089, and a step size of 0.026.

The DD value of the negative electrode may be 19 or greater and may range from 19 to 60. When the DD value of the negative electrode satisfies the above conditions, it means that a negative electrode active material included in the negative electrode active material layer is oriented at a predetermined angle. The DD value is a physical property value maintained although charging/discharging is performed.

In an exemplary embodiment of the present invention, the DD value is a value obtained by measuring XRD regarding a negative electrode obtained by breaking a lithium rechargeable battery including the negative electrode in a completely discharged state after the battery is charged and discharged. Here, a charging/discharging condition was 0.1 C to 0.2 C, which was performed once or twice.

Meanwhile, when a portion of the active material layer according to an exemplary embodiment of the present invention relatively adjacent to the substrate is an internal layer and a portion relatively far from the substrate is a surface layer, a DD value of the surface layer may be 6% to 50% of the DD value of the internal layer. Here, the DD value of the surface layer may be 4 to 26, and the DD value of the internal layer may be 50 to 80. For example, if the DD value of the internal layer is 68. 17, the DD value of the surface layer may be 13.35.

The range indicates that negative electrode active material particles included in the internal layer and the surface layer are oriented and orientation forms of the internal layer and the surface layer are similar. Here, the internal layer includes one surface in contact with a surface of the substrate, and the surface layer includes a surface exposed to the outside (or electrolyte).

The DD values of the internal layer and the surface layer may be obtained by Equation 1 by measuring each XRD.

FIG. 1 is a schematic view illustrating a process of separating an active material layer according to an exemplary embodiment of the present invention.

As illustrated in FIG. 1, after a tape 5 is adhered to the active material layer, when the tape 5 is removed, the active material layer is separated into a portion adhered to the tape and the other portion remaining on the substrate. Here, the portion remaining on the substrate 300 is an internal layer 33 and the portion adhered to the tape is a surface layer 35. Thus, in the separated state, XRD of the internal layer is measured and XRD of the surface layer is measured to obtain a DD value. Here, a thickness of the internal layer 33 may be smaller than a thickness of the surface layer 35, and the thickness of the internal layer 33 may be 30% or less of the thickness of the active material layer.

When XRD is measured using the CuKα line, a peak intensity ratio of the (004) plane to the (002) plane, i.e., $I_{004}/I_{002}$, of the negative electrode may be 0.04 or greater and may range from 0.04 to 0.07. When $I_{004}/I_{002}$ of the negative electrode is 0.04 or greater, a direct current (DC) internal resistance does not increase, rate characteristics, in particular, high rate characteristics, may be improved, and cycle lifespan characteristics may be enhanced.

A BET specific surface area of the negative electrode active material layer may be less than 5.0 m$^2$/g and may range from 6.0 m$^2$/g to 2.0 m$^2$/g. When the BET specific surface area of the negative electrode active material layer is less than 5.0 m$^2$/g, electrochemical lifespan characteristics of a cell may be improved. In an exemplary embodiment of the present invention, the BET is measured by charging/discharging the lithium rechargeable battery including the negative electrode, cutting the negative electrode obtained by breaking the battery in a completely discharged state into a predetermined size, and subsequently putting the cut negative electrode into a BET sample holder.

The negative electrode may have a sectional loading level (L/L) of 6 mg/cm$^2$ to 65 mg/cm$^2$.

The carbon-based negative electrode active material may be artificial graphite or a mixture of artificial graphite and natural graphite. The use of the crystalline carbon-based material of artificial graphite or the mixture of artificial graphite and natural graphite as the negative electrode active material may further enhance orientation characteristics of the carbon material in a plate with respect to an external magnetic field because the material has further developed crystallographical characteristics of particles, as compared with the use of amorphous carbon-based active material. A shape of the artificial graphite or natural graphite may be amorphous, plate-like, flake, spherical, fibrous, or a combination thereof, and may be any shape. Also, in the case of using the mixture of artificial graphite and natural graphite, a mixture ratio may be 70:30 wt % to 95:5 wt %.

Also, the negative electrode active material layer may further include at least one of an Si-based negative electrode active material, an Sn-based negative electrode active material, or LiMOx (M=metal)-based negative electrode active material. When the negative electrode active material layer further includes these materials, that is, when the negative electrode active material includes the carbon-based negative electrode active material as a first negative electrode active material and the negative electrode active material as a second negative electrode active material, a mixture ratio of the first negative electrode active material and the second negative electrode active material may be 50:50 to 99:1 weight ratio.

The LiMOx (M=metal-based negative electrode active material may be a lithium vanadium oxide.

The Si-based negative electrode active material may be Si, a Si—C complex, $SiO_x$ (0<x<2), a Si-Q alloy (Q is an element selected from the group consisting of an alkaline metal, an alkaline earth metal, group 13 elements, group 14 element, group 15 elements, group 16 elements, a transition metal, rare earth elements, and a combination thereof, and Si is not), the Sn-based negative electrode active material may be Sn, $SnO_2$, Sn—R alloy (R is an alkaline metal, an alkaline earth metal, group 13 elements, group 14 elements, group 15 elements, group 16 elements, a transition metal, rare earth elements, and a combination thereof, and Sn is not), and the like, or, at least one thereof may be mixed with $SiO_2$ and used. As the elements Q and R, one selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof may be used.

In the negative electrode active material layer, the content of the negative electrode active material may be 95 wt % to 99 wt % with respect to the total weight of the negative electrode active material layer.

In an exemplary embodiment of the present invention, the negative electrode active material layer may include a binder and may selectively further include a conductive material. The content of the binder in the negative electrode active material layer may be 1 wt % to 5 wt % with respect to the total weight of the negative electrode active material layer. Also, when the negative electrode active material layer further include a conductive material, 90 wt % to 98 wt % of the negative electrode active material, 1 wt % to 5 wt % of the binder, and 1 wt % to 5 wt % of the conductive material may be used.

The binder serves to allow the negative electrode active material particles to be readily adhered to each other and the negative electrode active material to be readily adhered to a current collector. As the binder, a non-soluble binder, a soluble binder, of a combination thereof. In case that a soluble binder is used as the negative electrode binder, a cellulose-based compound may be further included as a thickener to provide viscosity.

The conductive material is used to provide conductivity to an electrode, and any material may be used as an electro-conductive material without causing a chemical change in a configured battery.

The substrate may be formed of a group consisting of a copper foil, a nickel foil, a stainless steel foil, a titanium foil, nickel foam, copper foam, a conductive metal-coated polymer substrate, and a combination thereof.

Hereinafter, a method for manufacturing a negative electrode including graphite which is an oriented carbon-based active material will be described with reference to the accompanying drawings.

Figure 2:
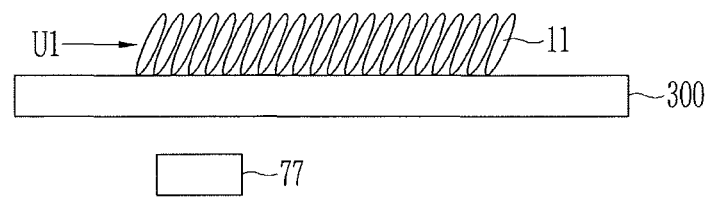
FIGS. 2 and 3 are views illustrating a method of manufacturing a negative electrode according to an exemplary embodiment of the present invention.
Figure 3:
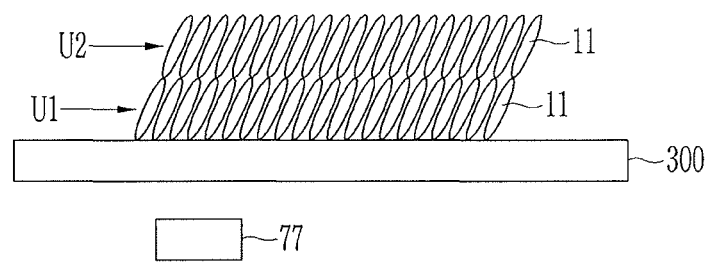

FIGS. 2 and 3 are views illustrating a method for manufacturing a negative electrode according to an exemplary embodiment of the present invention.

As illustrated in FIG. 2, a first unit layer U1 including a negative electrode active material on one surface of a substrate 300. Here, the negative electrode active material has viscosity of 2,300 cps by mixing 97.5 wt % of artificial graphite, 1.5 wt % of styrene butadiene rubber, and 1 wt % of carboxymethyl cellulose in a water solvent. Active material particles 11 are schematically illustrated for the purposes of description.

The substrate 300 may be a metal plate type current collector for forming a negative electrode for a rechargeable battery and may be, for example, a copper plate. The first unit layer U1 may be formed of a negative electrode active material at a loading level of 6 mg/cm$^2$.

Thereafter, the active material particles 11 are oriented such that one axis of graphite is tilted in the same direction using a magnetic flux. The active material particles 11 may be oriented simultaneously when the negative electrode active material is applied.

One axis of the particles 11 may be an axis which is relatively longer in length, as compared with other portions, and the particles 11 are oriented to be substantially perpendicular to one surface of the substrate using a magnetic field.

The magnetic field may be formed by disposing a permanent magnet 77 to be spaced apart from the other surface of the substrate. When the magnet is disposed below the substrate, a magnetic flux due to the magnet is formed in a direction perpendicular to the substrate. Here, a direction in which the magnetic flux is formed has a predetermined angle with a vector function according to a movement speed of the substrate, and thus, the negative electrode active material, for example, graphite, included in a negative electrode active material composition, is erected to have a predetermined angle with respect to the surface of the substrate.

Here, the magnetic flux may be applied with 1,000 Gauss to 10,000 Gauss, and a time exposed to the magnetic flux may be 1 second to 30 seconds.

The negative electrode active material on the substrate is cured to form the first unit layer U1. Here, curing, which is to fix the negative electrode active material by curing a binder in the negative electrode active material, may be performed at 90° C.

Thereafter, as illustrated in FIG. 3, a second unit layer U2 is formed on the first unit layer U1. The second unit layer U2 may be formed through the same process, that is, the applying, magnetic field orienting, and curing process using the same negative electrode active material as that of the first unit layer U1. Here, the second unit layer U2 may be formed at the same loading level as that of the first unit layer U1.

The process of forming the first unit layer U1 and the second unit layer U2 may be repeatedly performed according to a loading level of the active material layer to be performed, and the loading level may be changed when each unit layer is formed as necessary.

Figure 4:
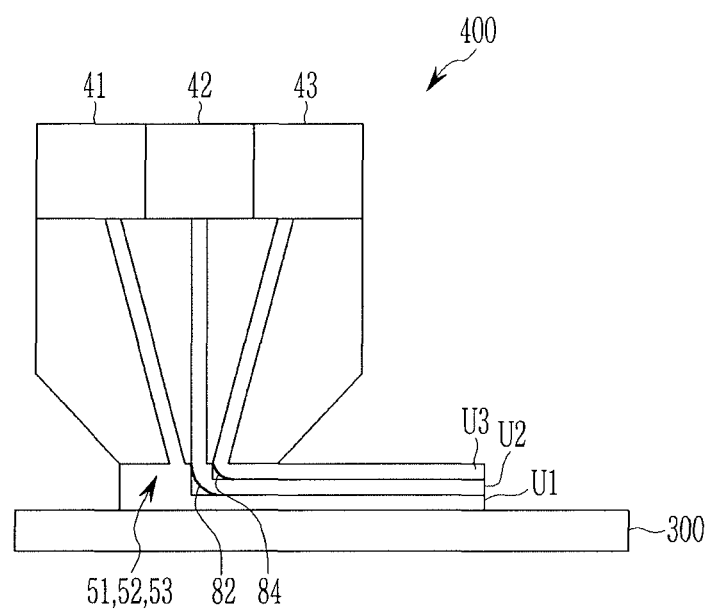
FIG. 4 is a view illustrating a method of manufacturing a negative electrode according to another exemplary embodiment of the present invention.
Figure 5:
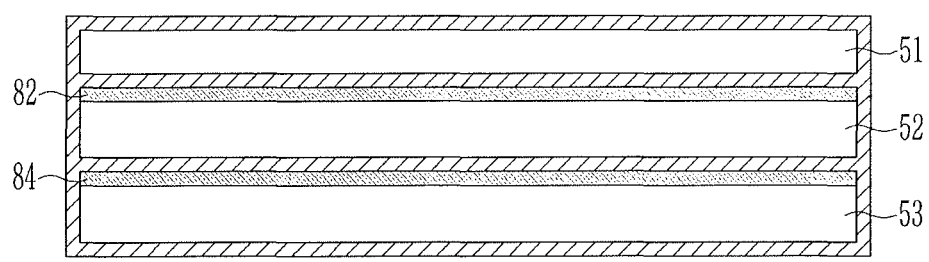
FIG. 5 is a plan view illustrating a nozzle and a guiding member of a dispensing device of FIG. 4.
Figure 6:
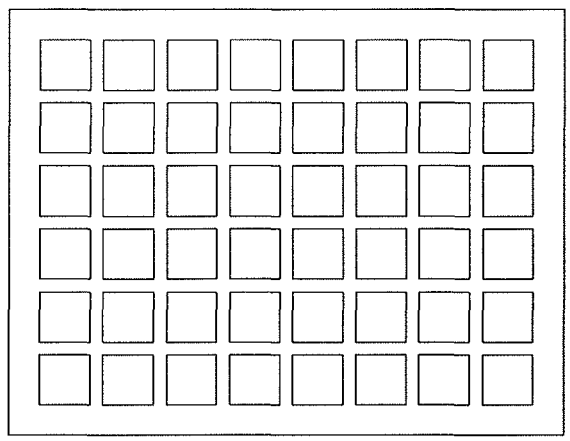
FIG. 6 is a schematic plan view of a guiding member.
Figure 7:
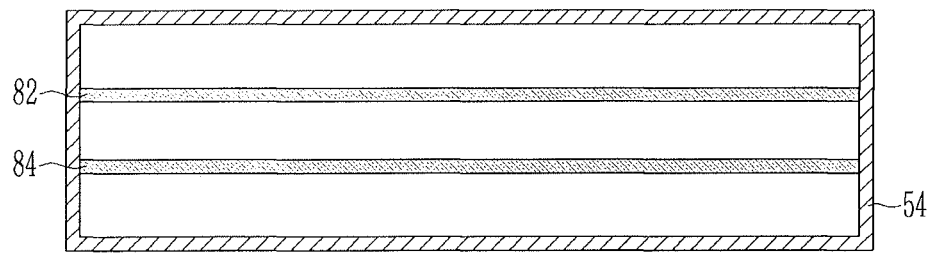
FIG. 7 is a plan view illustrating a nozzle and a guiding member of a dispensing device according to another exemplary embodiment of the present invention.

FIG. 4 is a view illustrating a method of manufacturing a negative electrode according to another exemplary embodiment of the present invention, FIG. 5 is a plan view illustrating a nozzle and a guiding member of a dispensing device of FIG. 4, FIG. 6 is a schematic plan view of a guiding member, and FIG. 7 is a plan view illustrating a nozzle and a guiding member of a dispensing device according to another exemplary embodiment of the present invention.

As illustrated in FIG. 4, a negative electrode active material is applied to one surface of a substrate 300 to form an active material layer including a plurality of stacked unit layers U1, U2, and U3.

Specifically, the negative electrode active material may be applied using a dispensing device 400.

The dispensing device 400 include storage portions 41, 42, and 43 storing a negative electrode active material slurry and nozzles 51, 52, and 53 respectively formed at one ends of the storage portions and discharging the slurry. Here, the dispensing device 400 includes three storage portions, for example, but is not limited thereto. That is, the dispensing device 400 may include only one or a larger number of storage portions as necessary.

Hereinafter, for the purposes of description, a first storage portion 41, a second storage portion 42, a third storage portion 43, a first nozzle 51, a second nozzle 52, and a third nozzle 53 will be referred in order of discharging the slurry to be adjacent to the substrate.

Referring to FIGS. 4 and 5, a first guide member 82 and a second guide member 84 are arranged on one side of the second nozzle 52 and the third nozzle 53, respectively.

The first guide member 82 may extend along one side of the second nozzle 52, and one side of the second nozzle 52 is a boundary portion of the second nozzle 52 relatively adjacent to the first nozzle 51. The second guide member 84 may extend along one side of the third nozzle 53, and one side of the third nozzle 53 is a boundary portion of the third nozzle 53 relatively adjacent to the second nozzle 52.

The other sides of the first guide member 82 and the second guide member 84 not connected to the second nozzle 52 and the third nozzle 53 are located outside the nozzles and adjacent to the substrate 300.

The first guide member 82 and the second guide member 84 may be formed of a material having flexibility and elasticity and may have a plate-like shape. The first guide member 82 and the second guide member 84 may have a net-shaped structure as illustrated in FIG. 6, and the net-shaped structure may be formed by forming a plurality of holes in a plate-like member or by weaving a wire.

In FIG. 5, it is illustrated that a plurality of nozzles are formed, but the first guide member 82 and the second guide member 84 may be arranged inside one nozzle 54 to divide the nozzle 54 into a plurality of smaller nozzles.

Meanwhile, when a slurry is applied using a plurality of nozzles as in one embodiment of the present invention, a plurality of unit layers may be formed through single dispensing. Also, the active material, e.g., graphite, in the slurry may be induced to be oriented due to the first guide member and the second guide member arranged in the nozzles.

That is, when the slurry is applied at a time with a desired thickness, an arrangement form of the active material may be different at a portion (hereinafter, referred to as an 'inner side portion') in contact with the substrate and a portion (hereinafter, referred to as an 'outer side portion') relatively away from the substrate.

The dispensing process is continuously performed, while moving the substrate, and thus, the active material particles of the inner side portion are arranged to be relatively perpendicular due to a frictional force, or the like, due to fine depressions and protrusions of the surface of the substrate. Meanwhile, the frictional force of the substrate may be reduced toward the outer side portion, and thus, horizontal arrangement of the active material particles may increase.

In an exemplary embodiment of the present invention, since surface characteristics that the active material particles are directly in contact with the substrate are provided by the first guide member and the second guide member, active material particles applied to the outer side portion have a vertical arrangement.

This may be confirmed by obtaining a DD value from Equation 1 above.

Table 1 shows a measurement of DD values of Comparative Examples and Examples.

In Comparative Examples, negative active material was applied and subsequently dried without performing an orientation process, and in Examples, the active material layer was formed according to the method illustrated in FIG. 3. Here, an overall thickness is a thickness of the active material layer before being divided.

A thickness difference in Table 1 is within a margin of error that occurs in terms of process, which does not affect DD value measurement. Also, discharge capacity retention rates of 2 C with respect to 0.2 C of Comparative Examples and Examples were measured.

TABLE 1

|  | Total DD | Total thickness (um) | DD of surface layer | Thickness of surface layer (um) | Internal DD | Thickness of internal layer (um) | Surface/ internal DD (%) | Discharge capacity retention rate 2 C/0.2 C (%) |
| --- | --- | --- | --- | --- | --- | --- | --- | --- |
| Comparative Example 1 | 18.42 | 77 | 0.57 | 60 | 54.69 | 17 | 1.04 | 66.12 |
| Comparative Example 2 | 17.24 | 77 | 2.45 | 55 | 45.8 | 22 | 5.35 | 66.4 |
| Comparative Example 3 | 18.79 | 77 | 2.6 | 60 | 46.82 | 20 | 5.55 | 69.93 |
| Comparative Example 4 | 48.72 | 61 | 26.87 | 50 | 52.79 | 11 | 50.9 | 75.4 |
| Example 1 | 24.16 | 90 | 4.65 | 79 | 75.51 | 11 | 6.16 | 80.34 |
| Example 2 | 32.47 | 73 | 7.4 | 50 | 62.47 | 23 | 11.85 | 83.89 |
| Example 3 | 43.63 | 78 | 13.35 | 56 | 68.17 | 22 | 19.58 | 85.58 |

TABLE 1-continued

|  | Total DD | Total thickness (um) | DD of surface layer | Thickness of surface layer (um) | Internal DD | Thickness of internal layer (um) | Surface/ internal DD (%) | Discharge capacity retention rate 2 C/0.2 C (%) |
|---|---|---|---|---|---|---|---|---|
| Example 4 | 46.17 | 76 | 17.18 | 56 | 75.81 | 20 | 22.66 | 86.84 |
| Example 5 | 32.45 | 84 | 18.74 | 63 | 52.45 | 21 | 35.73 | 87.1 |
| Example 6 | 52.9 | 73 | 22.22 | 52 | 50.78 | 21 | 43.75 | 88.5 |
| Example 7 | 41.59 | 65 | 25.59 | 46 | 52.79 | 19 | 48.48 | 90.1 |

Referring to Table 1, it can be seen that DD values of the surface layers in Example 1 to Example 7 are 4.65, 7.4, 13.35, 17.18, 18.74, 22.22, and 25.59, respectively, and DD values of the internal layers are 75.51, 62.47, 68.17, 75.81, 52.45, 50.78, and 52.79, respectively, and thus, surface layer DD values/internal layer DD values are 6.16, 11.85, 19.58, 22.66, 35.73, 43.75, and 48.48, respectively.

Also, it can be seen that the DD values of the surface layers in Comparative Examples 1 to 4 are 0.57, 2.45, 2.6, and 26.87, respectively, and DD values of the internal layers are 54.69, 45.8, 46.82, and 52.79, and thus, surface layer DD values/internal layer DD values thereof are 1.04, 5.35, 5.55, and 50.9, respectively.

In the negative electrode according to an exemplary embodiment of the present invention, the DD values of the surface layers located at the outer side portions have values of 6% to 50% with respect to the DD values of the internal layers located at the inner side portions of the substrates. This indicates that the internal layers and the surface layers are oriented and have a similar orientation form. Here, active material particles of the internal layers and the surface layers may be erected at a predetermined angle with respect to the surfaces of the substrates.

Meanwhile, the DD values of Comparative Examples have values less than 6% or exceeding 50%. This indicates that the surface layers and the internal layers do not have a similar orientation.

Also, according to the results of measurement of the discharge capacity retention rates of Comparative Examples and Examples, it can be seen that the discharge capacity retention rates of Comparative Examples are 66.12, 66.4, 69.93, and 75.4, respectively, while the discharge capacity retention rates of Examples are 80.34, 83.89, 85.58, 86.84, 87.1, 88.5, and 90.1, respectively, which are higher than those of Comparative Examples.

In this manner, when the orientation is performed as in Examples of the present invention, the discharge capacity retention rates may be enhanced by 10% or greater than those of Comparative Examples as related art.

The reason why the discharge capacity retention rate was reduced when the DD value of the surface layer DD value/internal layer DD value was less than 6% as in Comparative Examples is because a lithium ion path is reduced, and when the DD value of the surface layer DD value/internal layer DD value exceeds 50%, it is because electron resistance increases due to a degradation of contact between active materials.

Meanwhile, when the orientation forms of the active material particles of the internal layer and the surface layer of the negative electrode active material layer are similar, the discharge capacity retention rate may increase.

Figure 8:
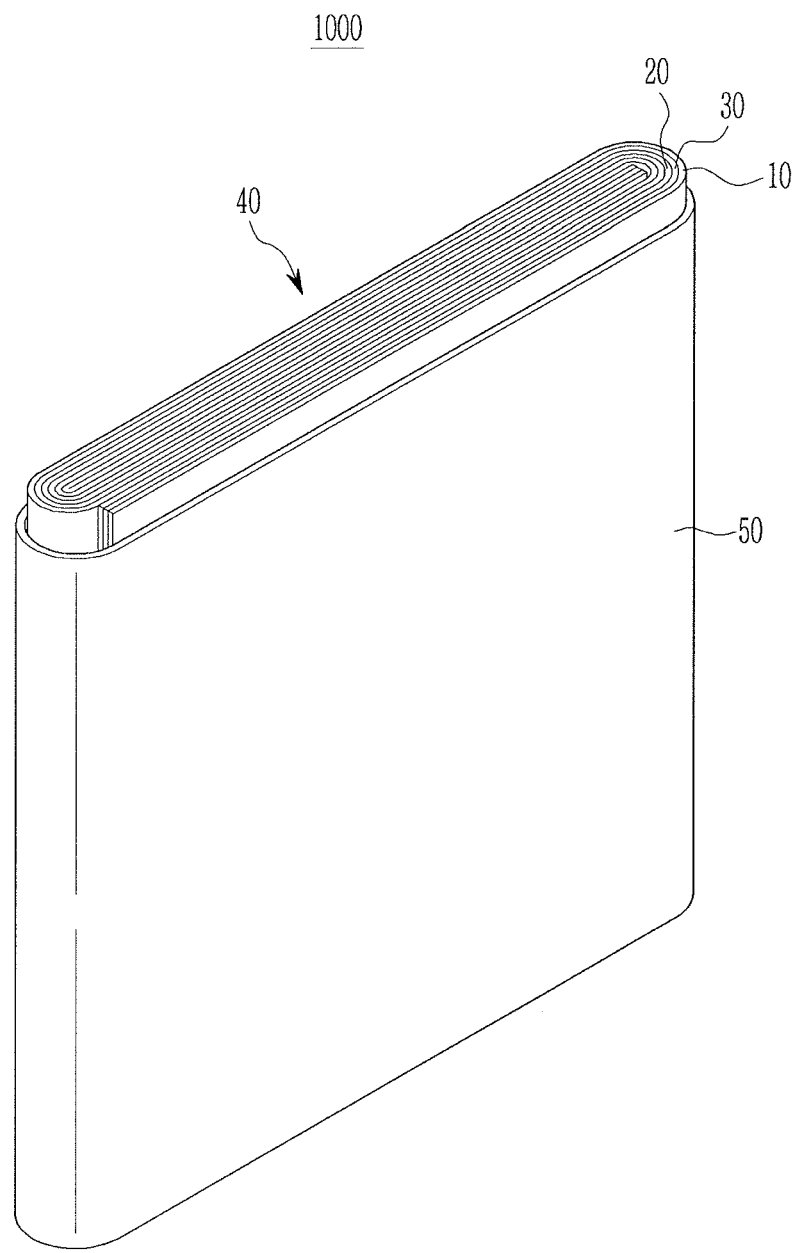
FIG. 8 is a schematic perspective view illustrating a portion of a rechargeable battery according to an exemplary embodiment of the present invention.

That is, when the active material particle arrangements at the inner side portion and the outer side portion of the active material layer are similar as in Examples of the present invention, active material particles arrangements in the entire active material layer are uniform and lithium ions smoothly migrate, and thus, an electrochemical reaction takes place uniformly, reducing a rate of degrading the negative electrode. FIG. 8 is a schematic perspective view illustrating a portion of a rechargeable battery according to an exemplary embodiment of the present invention.

The present invention is not limited thereto and may be applied to various types of batteries such as cylindrical or pouch-type batteries.

Referring to FIG. 8, a lithium rechargeable battery 1000 according to an exemplary embodiment of the present invention may include an electrode assembly 40 wound with a separator 30 interposed between a positive electrode 10 and a negative electrode 20 and a case 50 equipped with the electrode assembly 40. The positive electrode 10, the negative electrode 20, and the separator 30 may be immersed in an electrolyte (not shown).

The negative electrode 20 may be manufactured by the process illustrated in FIGS. 1 to 4 described above.

The positive electrode 10 includes a substrate and a positive electrode active material layer formed on the substrate. As the positive electrode active material, a compound enabling intercalation and deintercalation reversible to lithium (lithated intercalation compound) may be used. Specifically, one or more of complex oxides of a metal selected from among cobalt, manganese, nickel, and a combination thereof and lithium may be used.

In the positive electrode, the content of the positive electrode active material may be 90 wt % to 98 wt % with respect to the total weight of the positive electrode active material layer.

In an exemplary embodiment of the present invention, the positive electrode active material layer may further include a binder and a conductive material. Here, the content of the binder and the conductive material may be 1 wt % to 5 wt % with respect to the total weight of the positive electrode active material layer, respectively.

The binder serves to allow positive electrode active material particles to be readily adhered to each other and allow the positive electrode active material to be readily adhered to a current collector. Typical examples of the binder may be polyvinyl alcohol, carboxymethyl cellulose, hydroxypropyl cellulose, diacetyl cellulose, polyvinyl chloride, carboxylated polyvinyl chloride, polyvinyl fluoride, polymers containing ethylene oxide, polyvinyl pyrrolidone, polyurethane, polytetrafluoroethylene, polyvinylidene fluoride, polyethylene, polypropylene, styrene butadiene rubber, acrylated styrene butadiene rubber, epoxy resin, nylon, and the like, but are not limited thereto.

The conductor is used to provide conductivity to an electrode, and any material may be used as an electroconductive material without causing a chemical change in a configured battery.

The positive electrode substrate may be formed of Al but is not limited thereto.

The electrolyte includes a non-aqueous organic solvent and lithium salt.

The non-aqueous organic solvent serves as a medium allowing ions participating in an electrochemical reaction of the battery to migrate.

The lithium salt is dissolved in the organic solvent to act as a source of lithium ions in the battery to enable the lithium rechargeable battery to basically operate, and serves to accelerate migration of lithium ions between a positive electrode and a negative electrode. Typical examples of lithium salt include an electrolytic salt supporting one or two or more selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2, C_yF_{2y+1}SO_2$, here, x and y are natural numbers, for example, integers of 1 to 20), LiCl, LiI and $LiB(C_2O_4)_2$ (lithium bis(oxalato) borate (LiBOB)). A concentration of the lithium salt may be in the range of 0.1 M to 2.0 M. When the concentration of the lithium salt is included in the range, electrolyte may have appropriate conductivity and viscosity, exhibiting excellent electrolyte performance and allowing the lithium ions to effectively migrate.

The separator may be present between the positive electrode and the negative electrode according to types of lithium rechargeable batteries. As the separator, polyethylene/polypropylene, polyvinylidene fluoride, or a multilayer membrane including two or more layers thereof may be used, or a mixed multilayer membrane such as a polyethylene/polypropylene two-layer separator, a polyethylene/polypropylene/polyethylene three-layer separator, a polypropylene/polyethylene/polypropylene three-layer separator, and the like, may be used.

While the present invention has been particularly illustrated and described with reference to specific embodiments thereof, it will be apparent to those of ordinary skill in the art that various changes in form and details may be made without departing from the spirit and scope of the invention as defined by the following claims.

DESCRIPTION OF SYMBOLS

| | |
|---|---|
| 5: tape | 10: positive electrode |
| 11: particle | 20: negative electrode |
| 30: separator | 33: internal layer |
| 35: surface layer | 40: electrode assembly |
| 41: first storage portion | 42: second storage portion |
| 43: third storage portion | 50: case |
| 51, 52, 53, 54: nozzle | 77: permanent magnet |
| 82, 84: guide member | 300: substrate |
| 400: dispensing device | 1000: rechargeable battery |

The invention claimed is:

1. A negative electrode for a rechargeable battery comprising:
   a substrate; and
   an active material layer including a carbon-based negative electrode active material formed on at least one surface of the substrate,
   wherein:
   the active material layer includes an internal layer relatively adjacent to the substrate and a surface layer relatively away from the substrate and the internal layer and the surface layer have a degree of divergence (DD) defined by Equation 1 below,
   the DD value of the surface layer is 6% to 50% of the DD value of the internal layer, $$DD(Degree\ of\ Divergence)=(I_a/I_{total})100 \quad [Equation\ 1]$$

in Equation 1,
   $I_a$ is a sum value of peak intensities appearing at a non-planar angle when XRD is measured using a CuKα line,
   $I_{total}$ is a sum value of peak intensities appearing at every angle when XRD is measured using the CuKα line,
   the DD value of the internal layer is 50 to 80, and
   the DD value of the surface layer is 4 to 26.

2. The negative electrode of claim 1, wherein:
   the active material layer includes artificial graphite or a mixture of artificial graphite and natural graphite.

3. The negative electrode of claim 2, wherein:
   the active material layer further includes at least one of Si-based, Sn-based, LiMOx (M=metal)-based negative electrode active materials.

4. The negative electrode of claim 1, wherein:
   the internal layer is in contact with the substrate.

5. The negative electrode of claim 1, wherein:
   a thickness of the internal layer is 30% or less of a thickness of the active material layer.

6. A rechargeable battery comprising:
   the negative electrode of claim 1;
   a positive electrode; and
   an electrolyte.

* * * * *